3,445,676
MOISTURE SENSING CONTROL CIRCUIT DETECTING REVERSED POLARITY OF POWER SUPPLY
Wilbert E. Beller, Park Ridge, and Abed G. Kahale, Roselle, Ill., assignors to Controls Company of America, Melrose Park, Ill., a corporation of Delaware
Filed Feb. 21, 1967, Ser. No. 617,629
Int. Cl. H02h 3/06, 3/38
U.S. Cl. 307—94                          6 Claims

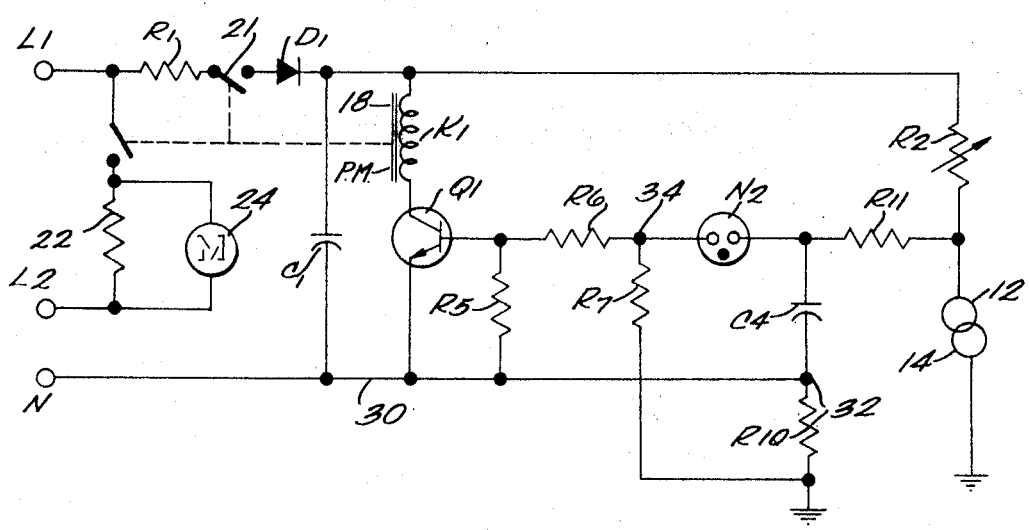

ABSTRACT OF THE DISCLOSURE

The control senses moisture between the sensing rings. As the moisture level drops, the resistance increases to charge capacitor until neon bulb conducts to bias base of transistor "on" and initiate termination of dryer operation. If line is connected to power supply with reversed polarity, full AC voltage is applied to normally grounded side of circuit and, on negative going portion of the AC sine wave, the transistor is biased "on" to stop operation. The plug must be properly connected to obtain operation.

Cross-reference to related application

The magnitic latch concept shown herein in claimed in copending application Ser. No. 617,630, filed Feb. 21, 1967.

Background of invention

To obtain reliable optimum operation of moisture sensing controls for clothes dryers, it has been considered necessary to provide an isolation transformer in the power supply. In addition to being expensive, the transformer requires space which is at a premium.

Summary of invention

The need for an isolation transformer is avoided in the present circuit by adding two inexpensive resistors and arranging the circuit so reversal of polarity will bias the transistor "on" when the AC supply is going negative. This terminates operation of the dryer. With proper polarity, the transistor can be biased "on" only when the neon bulb conduts as a result of sufficient charge on the capacitor indicating a desired dryness level (resistance) between the sensing rings.

Description of drawing

The single figure is a schematic wiring diagram showing the invention but omitting some features which would normally be incorporated but which would not aid in understanding the present invention.

Description of preferred embodiment

With correct polarity, line voltage is applied between $L_1$ and N and is rectified by diode $D_1$ and filtered by resistor $R_1$ and capacitor $C_1$. The DC supply is passed through a variable resistor $R_2$ (the value of which determines the moisture level sensed) and applied to a ring 12 in the dryer. As known in this art, the voltage on ring 12 will leak to the grounded ring 14 at a rate determined by the moisture content of the dryer contents, that is, by the effective resistance offered by the contents. The voltage on ring 12 charges capacitor $C_4$ through resistor $R_{11}$, the values of $C_4$ and $R_{11}$ being selected to give a suitable time delay in charging of $C_4$ to allow for clothes not bridging the rings for a period of time. As the charge builds up on capacitor $C_4$ the potential across neon bulb $N_2$ increases. Lead 16 connected to the other side of $N_2$ is connected to the base of transistor $Q_1$ through resistor $R_6$. Resistor $R_5$ is connected between the base and lead 30 which connects to N.

Coil $K_1$ is connected between the DC supply and the collector of the transistor while the emitter is connected to lead 30. As thus far described, when neon tube $N_2$ fires, the transistor conducts and the current through coil $K_1$ will set up a magnetic field opposing the field of permanent magnet 18. The permanent magnet is used to hold switches 20 and 21 closed by attracting a ferrous keeper. When the coil is energized by the transistor, the magnetic fields cancel and a return spring acting on the keeper will open switches 20 and 21. The switch 20 controls energization of the heater 22 and motor 24. This magnetic latch arrangement is claimed in the aforesaid application. Switch 21 opens the control circuit.

In usual practice, line 30 would be grounded directly but in the present circuit it is connected to ground through resistor $R_{10}$ at junction 32 between $C_4$ and $R_{10}$. Resistor $R_7$ is added between ground and junction 34 between $N_2$ and $R_6$. With this addition to the circuit, line 30, which normally connects to the N or ground side of the AC supply, is not a direct ground connection. In normal operation there is no voltage across $R_{10}$. But if the polarity is reversed, this circuit gives immediate automatic detection and lock-out of the control. With reversed polarity, full AC line voltage appears across $R_{10}$. On the positive going voltage of the AC supply nothing will happen but as the voltage goes negative junction 32 and line 30 go negative. This means the grounded side of $R_{10}$ and also junction 34 are positive with respect to line 30. The emitter of transistor $Q_1$ is negative going and the base is positive with respect to the emitter. This will bias the transistor $Q_1$ "on" and there will be sufficient current in coil $K_1$ to unlatch switches 20 and 21 to terminate operation. Filter capacitor $C_1$ can discharge through $K_1$ when the base is biased "on" to provide the necessary current. Repeated efforts to start the dryer by closing 20 and 21 will be to no avail. The plug must be reversed to proper polarity for operation.

This concept can work with a triode, thyratron, SCR, etc. Common to all is the use of a grid or gate which can be biased to cause the device to conduct and which will be so biased by the reversed polarity condition.

What is claimed is:
1. A dryer control having terminals for connection to an AC power supply,
   a sensor,
   the circuit including rectifier means for supplying DC voltage to the sensor for leakage therefrom at a rate dependent upon the moisture content of the clothes in the dryer,
   a capacitor in the circuit with the sensor to be charged as the clothes dry,
   a neon bulb connected to the capacitor and ionized when the capacitor charge reaches a given value,
   a transistor having its base connected to the neon bulb and its collector to the DC supply and its emitter to a line connected to the terminal adapted to be connected to the grounded side of the AC supply,
   control means responsive to current in the collector-emitter circuit when the base is biased "on" by current from the neon bulb and operative to effect termination of dryer operation,
   said line and said base being connected to ground through resistors whereby reversal of polarity of the terminals will allow polarity change of the line potential with the transistor base potential being of opposite sign relative to the line and the emitter with the result that the transistor is biased "on" as the line and emitter go negative.

2. A dryer control having terminals for connection to an AC power supply,
a sensor,
 the circuit including rectifier means for supplying DC voltage to the sensor for leakage therefrom at a rate dependent upon the moisture content of the clothes in the dryer,
 a capacitor in the circuit with the sensor to be charged as the clothes dry,
 means responsive to the charge on the capacitor to pass a control signal,
 a transistor having its base connected to receive the control signal to be biased "on" by the signal, the collector of the transistor being connected to the DC supply and the emitter being connected to a line connected to the one of the terminals adapted to be connected to the grounded side of the AC supply,
 control means responsive to the current in the collector-emitter circuit and operative to effect termination of dryer operation,
 said circuit including means rendering the transistor responsive to reversal of polarity of the terminals to be biased "on" and cause operation of the control means.

3. A control according to claim 2 in which the last named means includes a resistor between said line and ground and another resistor between the transistor base circuit and ground.

4. A control according to claim 3 including a capacitor between the DC supply and said line.

5. A dryer control having terminals for connection to an AC power supply,
a sensor,
 the circuit including rectifier means for supplying DC voltage to the sensor for leakage therefrom at a rate dependent upon the moisture content of the clothes in the dryer,
 a capacitor in the circuit with the sensor to be charged as the clothes dry,
 means responsive to the charge on the capacitor to pass a control signal,
 a transistor having its base connected to receive the control signal to be biased "on" by the signal, the collector of the transistor being connected to the DC supply and the emitter being connected to a line connected to the one of the terminals adapted to be connected to the grounded side of the AC supply,
 control means responsive to the current in the collector-emitter circuit and operative to effect termination of dryer operation,
 said line normally being at ground potential and being connected to ground through a resistor,
 the base of the transistor being connected to ground through a resistor,
 reversal of the polarity of the terminals being operative to bias the base positive relative to the emitter while the voltage in said line is going negative to thereby bias the transistor "on" and operate the control means.

6. A dryer control having terminals for connection to an AC power supply,
a sensor,
 the circuit including rectifier means for supplying DC voltage to the sensor for leakage therefrom at a rate dependent upon the moisture content of the clothes in the dryer,
 a capacitor in the circuit with the sensor to be charged as the clothes dry,
 means responsive to the charge on the capacitor to pass a control signal,
 an electronic device connected to receive the control signal and rendered conductive by the signal,
 control means connected to respond to conduction of the electronic device and operative to effect termination of dryer operation,
 said electronic device being connected in the circuit so reversed connection of the terminals to the AC supply will bias the control element of the electronic device to render the electronic device conductive.

References Cited
UNITED STATES PATENTS

| | | | |
|---|---|---|---|
| 3,205,590 | 9/1965 | Deaton | 34—45 |
| 3,266,167 | 8/1966 | Finnegan | 317—148.5 X |
| 3,271,878 | 9/1966 | Martin | 307—118 X |
| 3,333,345 | 8/1967 | Miller | 34—45 |
| 3,343,272 | 9/1967 | Janke et al. | 34—45 |

ROBERT K. SCHAEFER, *Primary Examiner.*

T. B. JOIKE, *Assistant Examiner.*

U.S. Cl. X.R.

34—45; 307—118, 127; 317—17, 43, 148.5